(12) United States Patent
Li et al.

(10) Patent No.: US 11,570,612 B2
(45) Date of Patent: Jan. 31, 2023

(54) FLEXIBLE ELECTRONIC SUBSCRIBER IDENTITY MODULE DEPLOYMENT

(71) Applicant: Apple Inc., Cupertino, CA (US)

(72) Inventors: Li Li, Los Altos, CA (US); Najeeb M. Abdulrahiman, Fremont, CA (US); Arun G. Mathias, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/103,892

(22) Filed: Nov. 24, 2020

(65) Prior Publication Data

US 2021/0160683 A1    May 27, 2021

Related U.S. Application Data

(60) Provisional application No. 62/939,944, filed on Nov. 25, 2019.

(51) Int. Cl.
*H04B 1/38* (2015.01)
*H04W 8/18* (2009.01)
(Continued)

(52) U.S. Cl.
CPC ............ *H04W 8/183* (2013.01); *H04W 8/205* (2013.01); *H04W 12/06* (2013.01); *H04W 12/35* (2021.01)

(58) Field of Classification Search
None
See application file for complete search history.

(56) References Cited

U.S. PATENT DOCUMENTS

| 2017/0338962 A1 | 11/2017 | Li et al. |
| 2018/0027486 A1 | 1/2018 | Corradino |

(Continued)

FOREIGN PATENT DOCUMENTS

| EP | 3277003 A1 * | 1/2018 | ............ H04W 12/06 |
| KR | 102014108 B1 | 8/2019 | |

OTHER PUBLICATIONS

SGP22_RSP Technical Specification Version 2.2_pub. date Sep. 1, 2017.pdf.*

(Continued)

*Primary Examiner* — Jinsong Hu
*Assistant Examiner* — Alexander J Yi
(74) *Attorney, Agent, or Firm* — Dickinson Wright RLLP (57) ABSTRACT

Techniques for flexible electronic subscriber identity module (eSIM) deployment to a wireless device by a network server, including generation of multiple eSIMs using an identical eSIM identifier value, such as an identical integrated circuit card identifier (ICCID) value, and subsequent selection of an eSIM based on capabilities of the wireless device. Multiple eSIMs that correspond to different sets of wireless device capabilities are generated without knowledge of the wireless communication standards that a wireless device supports. The multiple eSIMs include a first eSIM that includes fifth generation (5G) wireless communication protocol information and a second eSIM that excludes 5G wireless communication protocol information. The network server selects an eSIM from the multiple eSIMs based on whether the wireless device is 5G capable. After selection and binding of a profile package that includes the eSIM, the remaining eSIMs that use the identical ICCID value are deleted, for security enforcement against cloning.

20 Claims, 8 Drawing Sheets

(51) Int. Cl.
  *H04W 12/06* (2021.01)
  *H04W 8/20* (2009.01)
  *H04W 12/30* (2021.01)

(56) References Cited

U.S. PATENT DOCUMENTS

2018/0063668 A1    3/2018  Li et al.
2019/0075453 A1*   3/2019  Yoon ..................... H04W 12/06
2019/0373448 A1*  12/2019  Gao ...................... H04W 12/40
2020/0008049 A1*   1/2020  Namiranian .......... H04W 12/72

OTHER PUBLICATIONS

International Patent Application No. PCT/US2020/062296—International Search Report and Written Opinion dated Mar. 2, 2021.
"RSP Technical Specification", GSM Association, Version 2.1, Feb. 27, 2017.
VIVO, "Report of phase 1 Multi-SIM email discussion", RP-191898, 3GPP TSG-RAN WG #85, Newport Beach, USA, Sep. 9, 2019.
European Patent Application 20894843.0—Extended European Search Report dated Jul. 18, 2022.
GSM Association: "Embedded SIM Remote Provisioning Architecture, Version 4.0", Feb. 25, 2019 (Feb. 25, 2019), pp. 1-103, XP055677127, Retrieved from the Internet: URL:https://www.gsma.com/newsroom/wp-content/uploads//SGP.01-v4.0.pdf [retrieved on Mar. 17, 2020] * Clause 3.3.1.1 Functions for Data Preparation; p. 31 * *Clause 3.5.3 Profile Ordering (Proprietary) ; p. 38 * * Clause 3.5.4 Profile Download and Installation; p. 39-p. 42 * * Figure 6: Profile Download *.

* cited by examiner

FLEXIBLE ELECTRONIC SUBSCRIBER IDENTITY MODULE DEPLOYMENT

CROSS-REFERENCE TO RELATED APPLICATIONS

The present application claims the benefit of U.S. Provisional Application No. 62/939,944, entitled "FLEXIBLE ELECTRONIC SUBSCRIBER IDENTITY MODULE DEPLOYMENT," filed Nov. 25, 2019, the content of which is incorporated by reference herein in its entirety for all purposes.

FIELD

The described embodiments set forth techniques for flexible electronic subscriber identity module (eSIM) deployment for a wireless device by a wireless network entity, including generation of multiple eSIMs using an identical eSIM identifier and a set of common eSIM configuration data, and subsequent selection of an eSIM based on capabilities of the wireless device.

BACKGROUND

Wireless mobile network operators (MNOs) continue to upgrade wireless networks to support newer wireless communication standards, including fourth generation (4G) Long Term Evolution (LTE) and Long Term Evolution Advanced (LTE-A) technologies as well as fifth generation (5G) technologies. Wireless devices continue to evolve to incorporate newer, configurable wireless credentials, such as eSIMs that can be loaded to and subsequently activated on an electronic universal integrated circuit card (eUICC) of a wireless device. To support newer 5G wireless communication standards, specifications for eSIMs for 5G enabled wireless devices are being developed. Rather than a universal eSIM that can be loaded to a 5G-capable wireless device or to a non-5G-capable wireless device, standards are proposed for 5G eSIMs and non-5G eSIMs. As such, MNOs need to determine a proper eSIM type to load to a wireless device based on the wireless device's wireless communication capabilities. As these capabilities may be unknown when an eSIM is assigned to a wireless device, there exists a need for flexible eSIM assignment and deployment that accounts for different wireless device capabilities.

SUMMARY

Representative embodiments set forth techniques for flexible electronic subscriber identity module (eSIM) deployment to a wireless device by a wireless network entity, including generation of multiple eSIMs using an identical eSIM identifier and a set of common eSIM configuration data, such as ciphering keys, integrity keys, applets, elementary files, and/or dedicated files, and subsequent selection of an eSIM from the multiple eSIMs based on capabilities of the wireless device. Capabilities to support different wireless communication standards of a wireless device may be unknown when assignment of an eSIM to a wireless device (or generation of an eSIM for future assignment) occurs. To account for different capabilities, multiple eSIMs that correspond to different sets of wireless device capabilities can be generated without knowledge of the wireless communication standards that a wireless device supports. In some embodiments, responsive to an order from an MNO back-end server, a wireless network entity, e.g., a provisioning server, can generate multiple eSIMs for a wireless device. In some embodiments, a specific wireless device is specified in the order. In some embodiments, the order includes a hardware identifier value for the wireless device, such as an eUICC identifier (EID) value. In some embodiments, the provisioning server selects a unique eSIM identifier value, such as an integrated circuit card identifier (ICCID) value to associate with an eSIM, and uses the identical unique eSIM identifier value to generate multiple eSIMs, where each eSIM corresponds to a different wireless communication standard capability for a wireless device. Subsequently, the provisioning server can select one of the multiple eSIMs to download to a wireless device based on information obtained regarding wireless communication capabilities of the wireless device. In some embodiments, the multiple eSIMs include a first eSIM that includes 5G information and a second eSIM that excludes 5G information. In some embodiments, the 5G information includes file structures and/or applets specific to 5G wireless communication protocols. In some embodiments, the provisioning server selects an eSIM from the multiple eSIMs based at least in part on whether the wireless device is 5G capable. After selection of an eSIM that uses an ICCID value and a binding of a profile package that includes the eSIM for a wireless device, the provisioning server deletes remaining eSIMs of the multiple eSIMs that use the identical ICCID value.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Representative embodiments set forth techniques for flexible electronic subscriber identity module (eSIM) deployment for a wireless device by a wireless network entity, including generation of multiple eSIMs using an identical eSIM identifier and a set of common eSIM configuration data, such as ciphering keys, integrity keys, applets, elementary files, and/or dedicated files, and subsequent selection of an eSIM based on capabilities of the wireless device. Wireless communication standards continue to evolve including newer, fifth generation (5G) wireless protocols. New versions of wireless protocols may specify features that may be incompatible with previous generation wireless communication devices. Some wireless communication devices may support 5G capabilities, some wireless communication devices may require particular software versions to support 5G capabilities, and some wireless communication devices may not support 5G capabilities. Capabilities of a wireless device to support different wireless communication standards, however, may be unknown when assignment of an eSIM to a wireless device occurs. An MNO may need to select a proper eSIM type for a target wireless device to forestall compatibility issues, such as to avoid an installation failure or a post-installation malfunction. Instead, different eSIM types may be generated and loaded to wireless devices based on their capabilities.

To account for different capabilities of different wireless devices, multiple eSIMs that correspond to different sets of wireless device capabilities can be generated for a wireless device without knowledge of the wireless communication standards that the wireless device supports. In some embodiments, responsive to an order from an MNO back-end server, a wireless network entity, e.g., a provisioning server, generates multiple eSIMs for a wireless device. In some embodiments, the multiple eSIMs are specific to a wireless device identified in the order. In some embodiments, the order includes a hardware identifier value for the wireless device, such as an eUICC identifier (EID) value. In some embodiments, the order includes a unique eSIM identifier value to be associated with the eSIM and with which to identify the eSIM. In some embodiments, the order includes an eSIM profile type to be generated. In some embodiments, the provisioning server selects a unique eSIM identifier value, such as an integrated circuit card identifier (ICCID) value, and uses the identical unique eSIM identifier value to generate the multiple eSIMs, where each eSIM corresponds to a different wireless communication standard capability for a wireless device. In some embodiments, each eSIM of the multiple eSIMs include a set of common eSIM configuration data, such as one or more of: ciphering keys, integrity keys, applets, elementary files, and/or dedicated files. In some embodiments, capability of a wireless device to support a particular wireless communication protocol, such as a 5G protocol, is not available when the multiple eSIMs are generated. Subsequently, the provisioning server can select one of the multiple eSIMs to download to a wireless device based on information obtained regarding wireless communication capabilities of the wireless device. In some embodiments, the multiple eSIMs include a first eSIM that includes 5G information and a second eSIM that excludes 5G information. In some embodiments, the 5G information includes file structures and/or applets specific to 5G wireless communication protocols. In some embodiments, the provisioning server selects an eSIM from the multiple eSIMs based on whether the wireless device is 5G capable. The provisioning server can select an eSIM that includes 5G information when the wireless device is 5G capable and can select an eSIM that excludes 5G information when the wireless device is not 5G capable. After selection of an eSIM that uses an ICCID value and a binding of a profile package that includes the eSIM for the wireless device, the provisioning server deletes remaining eSIMs of the multiple eSIMs that use the identical ICCID value.

These and other embodiments are discussed below with reference to FIGS. 1 through 7; however, those skilled in the art will readily appreciate that the detailed description given herein with respect to these figures is for explanatory purposes only and should not be construed as limiting.

Figure 1:
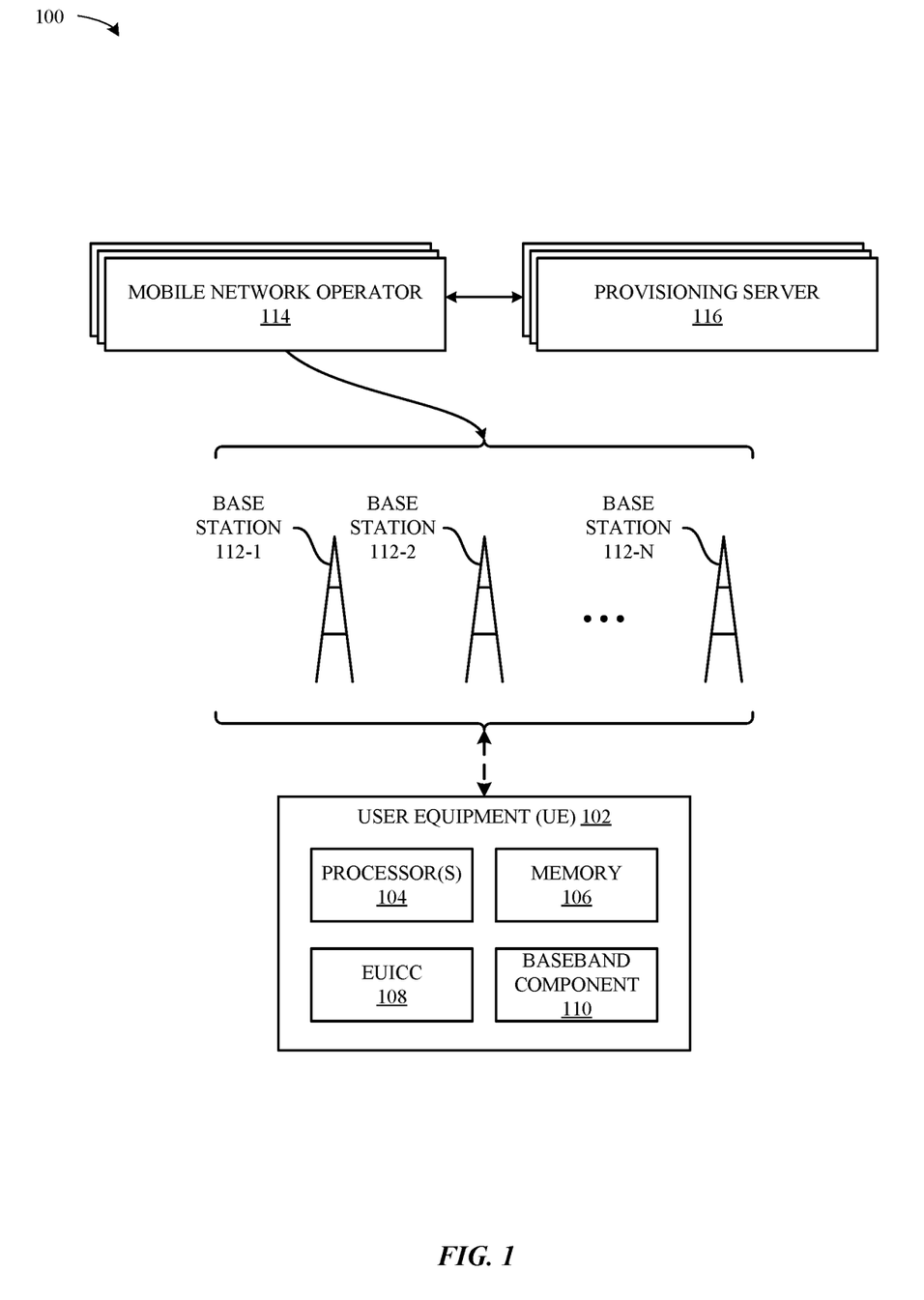
FIG. 1 illustrates a block diagram of different components of an exemplary system configured to implement the various techniques described herein, according to some embodiments.

FIG. 1 illustrates a block diagram of different components of a system 100 that is configured to implement the various techniques described herein, according to some embodiments. More specifically, FIG. 1 illustrates a high-level overview of the system 100, which, as shown, includes a user equipment (UE) 102, a group of base stations 112-1 to 112-n that are managed by different Mobile Network Operators (MNOs) 114, and a set of provisioning servers 116 that are in communication with the MNOs 114. The UE 102 can represent a mobile computing device (e.g., an iPhone® or an iPad® by Apple®), the base stations 112-1 to 112-n can represent cellular wireless network entities including evolved NodeBs (eNBs) and/or next generation NodeBs (gNBs or gNB) that are configured to communicate with the UE 102, and the MNOs 114 can represent different wireless service providers that provide specific services (e.g., voice and data) to which the UE 102 can be subscribed. The UE 102 may also be referred to as a wireless device, a mobile device, a mobile wireless device, or the like.

As shown in FIG. 1, the UE 102 can include processing circuitry, which can include one or more processors 104 and memory 106, an embedded Universal Integrated Circuit Card (eUICC) 108, and a baseband component 110. In some embodiments, the UE 102 includes one or more physical UICC cards, also referred to as Subscriber Identity Module (SIM) cards (not shown), in addition to or substituting for the eUICC. The components of the UE 102 work in conjunction to enable the UE 102 to provide useful features to a user of the UE 102, such as localized computing, location-based services, and Internet connectivity. The eUICC 108 can be configured to store multiple electronic SIMs (eSIMs) for accessing different services offered by one or more MNOs 114 through base stations 112-1 to 112-n. For example, the eUICC 108 can be configured to store and manage one or more eSIMs for one or more MNOs 114 for different subscriptions to which the UE 102 has been associated. To be able to access services provided by the MNOs, an eSIM can be provisioned to the eUICC 108. In some embodiments, the eUICC 108 obtains one or more eSIMs (or updates for one or more eSIMs) from one or more associated provisioning servers 116. It is noted that provisioning servers 116 can be maintained by a manufacturer of the UE 102, the MNOs 114, third party entities, and the like. Communication of eSIM data between a provisioning server 116 and the eUICC 108 (or between the provisioning server 116 and processing circuitry of the UE 102 external to the eUICC 108, e.g., the processor 104) can use a secure communication channel. In some embodiments, the UE 102 provides information about communication capability of the UE 102 to the provisioning server 116, which provides one or more eSIMs to the UE 102 that are selected based at least in part on the communication capability of the UE 102.

Figure 2:
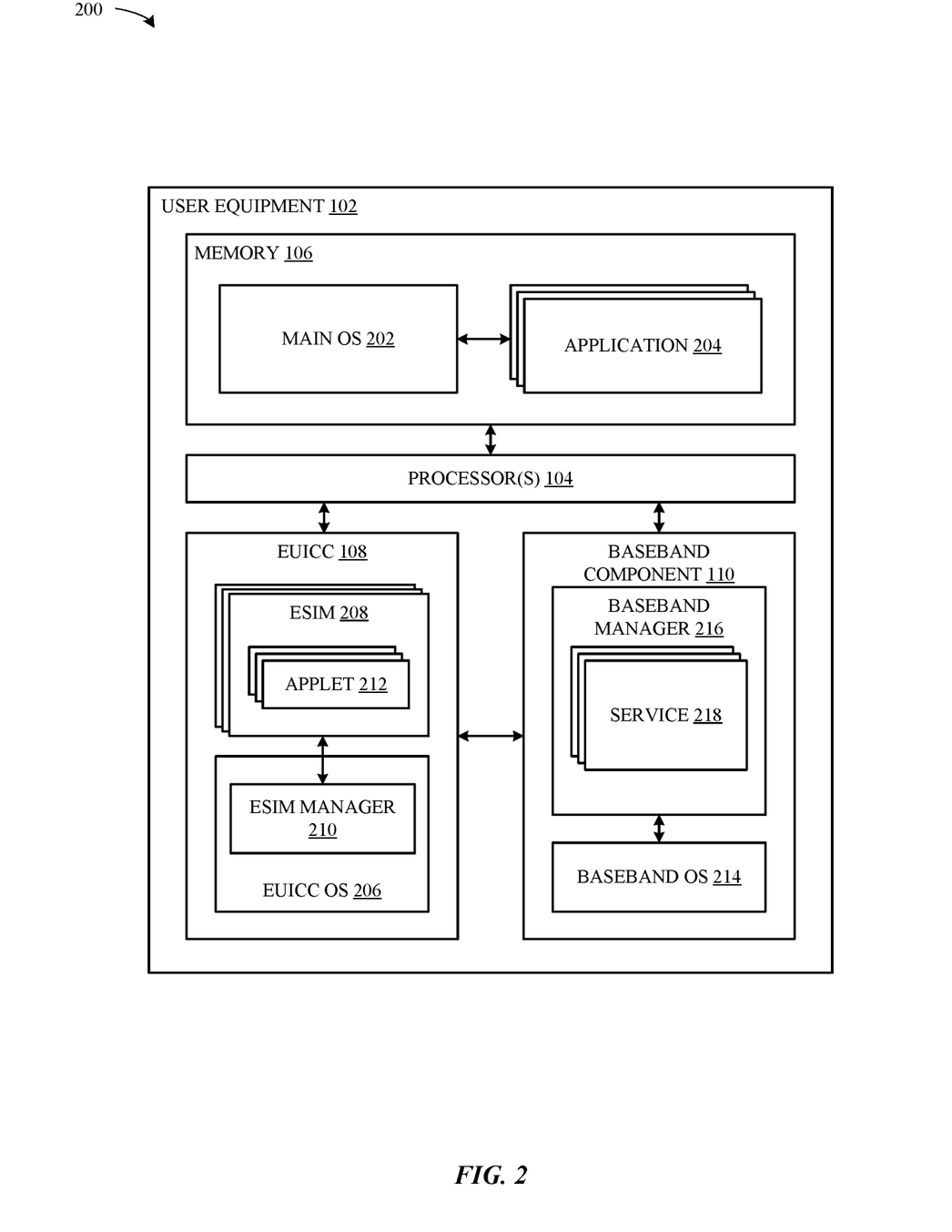
FIG. 2 illustrates a block diagram of a more detailed view of exemplary components of the system of FIG. 1, according to some embodiments.

FIG. 2 illustrates a block diagram of a more detailed view 200 of particular components of the UE 102 of FIG. 1, according to some embodiments. As shown in FIG. 2, the processor(s) 104, in conjunction with the memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage the hardware resources of the eUICC 108 (e.g., a processor and a memory embedded in the eUICC 108). The eUICC OS 206 can also be configured to manage eSIMs 208 that are stored by the eUICC 108, e.g., by installing, enabling, disabling, modifying, or otherwise performing management of the eSIMs 208 within the eUICC 108 and providing the baseband component 110 with access to the eSIMs 208 to provide access to wireless services for the UE 102. The eUICC 108 OS can include an eSIM manager 210, which can perform management functions for various eSIMs. According to the illustration shown in FIG. 2, each eSIM 208 can include a number of applets 212 that define the manner in which the eSIM 208 operates. For example, one or more of the applets 212, when implemented by the baseband component 110 and the eUICC 108, can be configured to enable the UE 102 to communicate with an MNO 114 and provide useful features (e.g., voice connections, messaging services, internet access and the like) to a user of the UE 102.

As also shown in FIG. 2, the baseband component 110 of the UE 102 can include a baseband OS 214 that is configured to manage hardware resources of the baseband component 110 (e.g., a processor, a memory, different radio components, etc.). According to some embodiments, the baseband component 110 can implement a baseband manager 216 that is configured to interface with the eUICC 108 to establish a secure channel with a provisioning server 116 and obtaining information (such as eSIM data) from the provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the UE 102 and MNOs 114 according to the different eSIMs 208 that are enabled within the eUICC 108.

Figure 3:
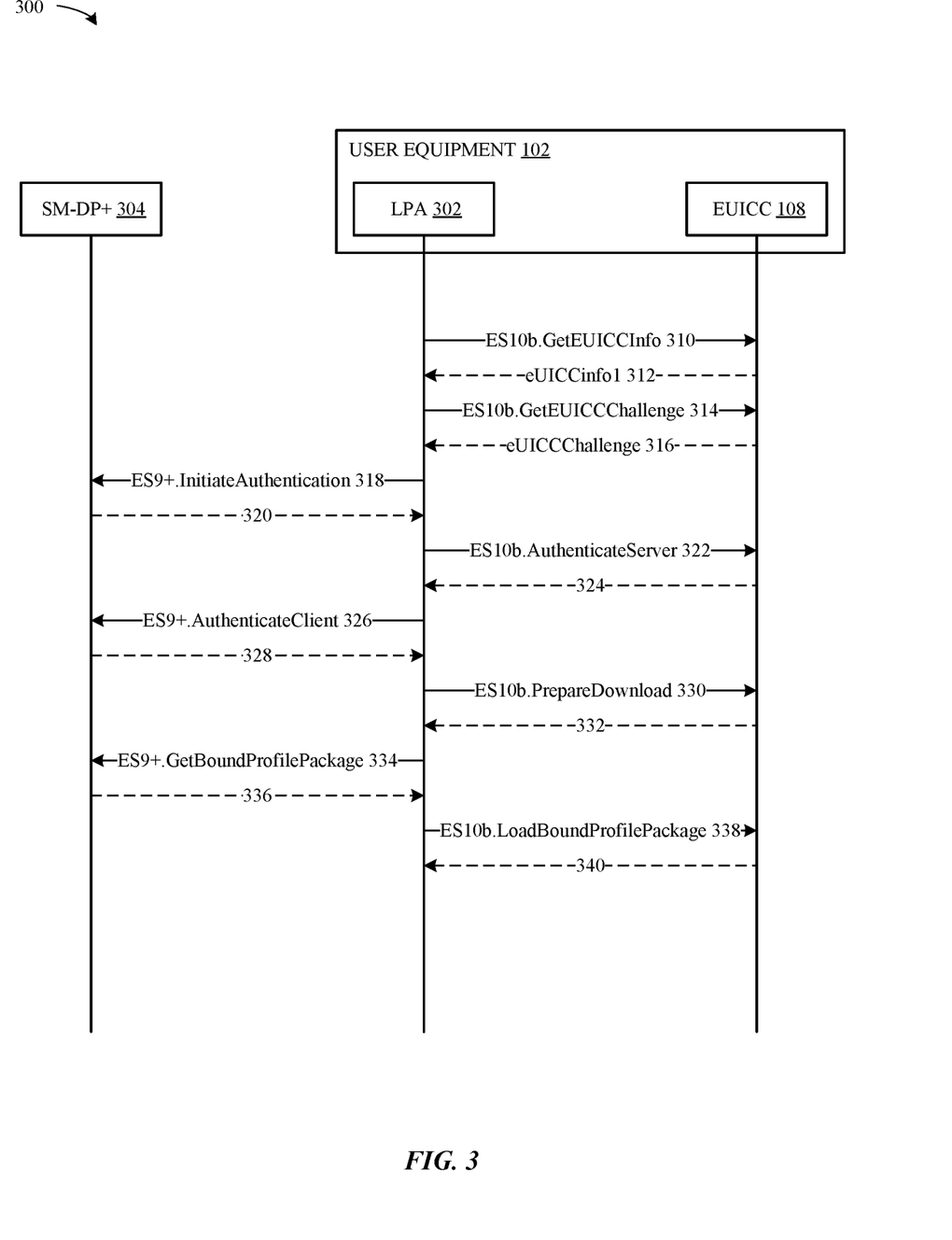
FIG. 3 illustrates an exemplary message exchange to provision an eSIM to a wireless device, according to some embodiments.

FIG. 3 illustrates a block diagram 300 of an exemplary message exchange to provision an eSIM to the UE 102 in accordance with an established Global System for Mobile Communications (GSM) Association (GSMA) protocol, e.g., an SGP.22 Remote Service Provisioning (RSP) Technical Specification. At 310, a local profile assistant (LPA) 302 operational on the UE 102 and external to the eUICC 108 initiates an eSIM download by sending a GetEUICCInfo message to an eUICC 108 of the UE 102 to obtain information from the eUICC 108, e.g., eUICCinfo1 returned at 312, to perform a mutual authentication procedure with a network entity, e.g., with a subscription manager data preparation (SM-DP+) server 304. At 314, the LPA 302 sends a GetEUICCChallenge message to the eUICC 108 to obtain an eUICCChallenge from the eUICC 108 to use for authentication with the SM-DP+ server 304. At 318, the LPA 302 of the UE 102 sends, via a secure connection to the SM-DP+ server 304, an InitiateAuthentication message that includes the eUICCinfo1 and eUICCChallenge to initiate authentication with the SM-DP+ server 304. Upon successful verification of the eUICCinfo1 by the SM-DP+ server 304, the LPA 302 receives in response, at 320, information to authenticate the SM-DP+ server 304, where the information (and/or further parameters derived based on the received information) to the eUICC 108 to verify authenticity of the SM-DP+ server 304. Upon successful verification of the information by the eUICC 108, at 324, the eUICC 108 provides additional information, e.g., signed certificates and/or signatures, to the LPA 302 to send to the SM-DP+, at 326, to authenticate the eUICC 108 of the UE 102 with the SM-DP+ server 304, and confirmation of successful authentication of the eUICC 108 by the SM-DP+ server 304 can be provided at 328. Following mutual authentication, the UE 102 and SM-DP+ server 304 perform a profile download procedure to obtain an eSIM from the SM-DP+ server 304 to load into the eUICC 108 of the UE 102. The LPA 302 initiates the download procedure by sending a PrepareDownload command at 330 to the eUICC 108, which verifies information provided in the PrepareDownload command and returns, at 332, signed information to the LPA 302, which communicates the signed information in a GetBoundProfilePackage command at 334 to the SM-DP+ server 304. Following successful verification of the signed information, the SM-DP+ server 304 returns, at 336, a bound profile package that includes an eSIM (profile) for loading to the eUICC 108. The LPA 302, at 338, forwards the bound profile package to the eUICC 108 for loading the eSIM, and the eUICC 108 provides confirmation of successful loading of the eSIM at 340 to the LPA 302. In order to accommodate different wireless communication capabilities of the UE 102, and to allow for different eSIMs corresponding to different wireless communication capabilities, the procedure illustrated in FIG. 3 can be modified as further described in the procedure illustrated in FIGS. 4A and 4B.

Figure 4A:
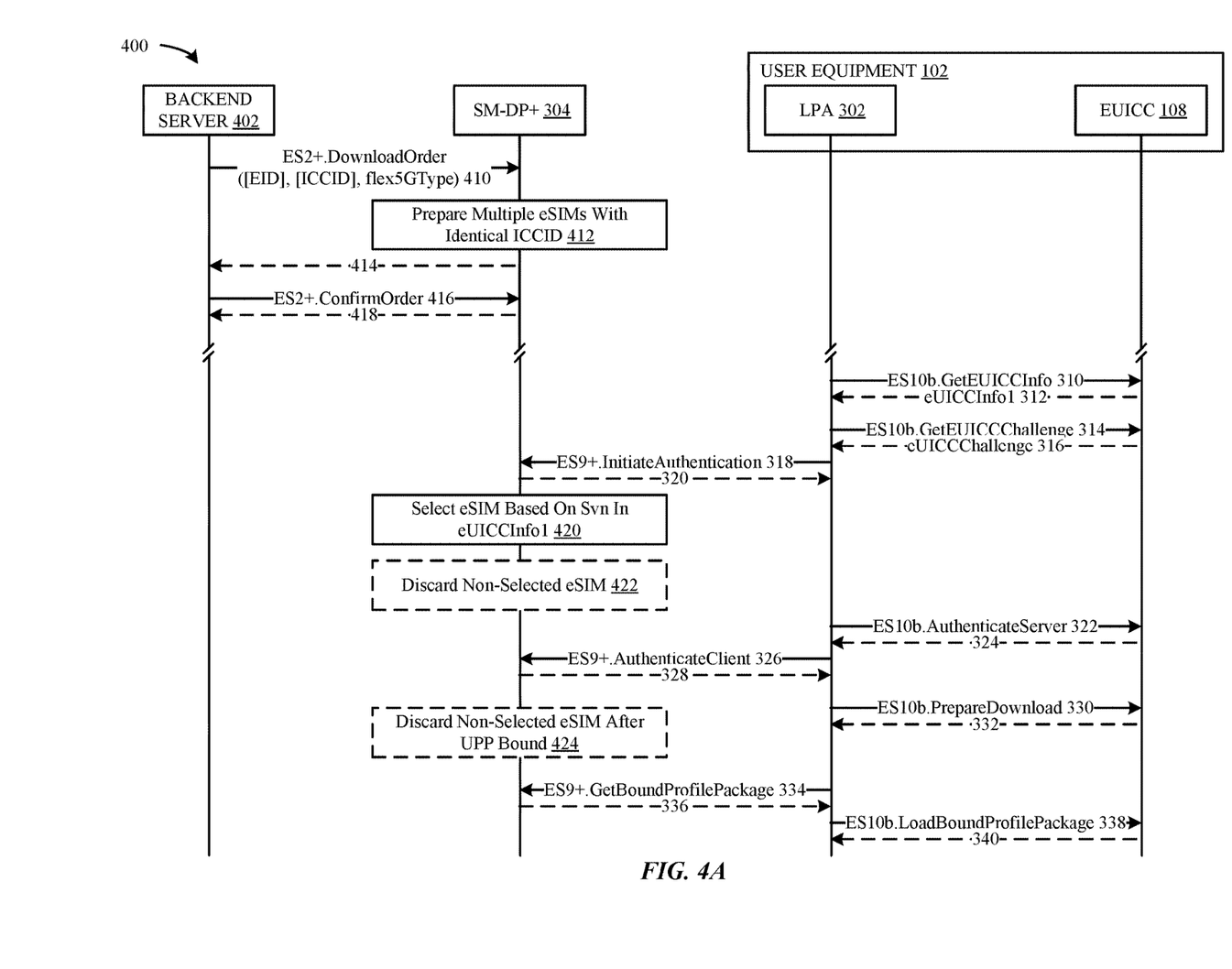
FIGS. 4A and 4B diagrams of exemplary message exchanges for flexible eSIM deployment to a wireless device, according to some embodiments.

FIG. 4A illustrates a diagram 400 of exemplary message exchange for flexible eSIM deployment to a UE 102. At 410, an MNO network entity, e.g., a backend server 402, initiates a download procedure for an eSIM (profile) by sending a DownloadOrder message to the SM-DP+ server 304. The DownloadOrder message can include a unique hardware identifier value, e.g., an eUICC 108 identifier (EID) value, for the UE 102 to which eSIM will be downloaded. In some embodiments, the DownloadOrder message does not include an EID value, as the EID value for the UE 102 may be unknown at the time of the submission of the DownloadOrder message to the SM-DP+ 304. In some embodiments, the DownloadOrder message includes an eSIM identifier value, e.g., an ICCID value for the eSIM to the be downloaded to the UE 102. In some embodiments, the DownloadOrder message does not include an ICCID value, and the SM-DP+ 304 selects an ICCID value to associate with a set of eSIMs for the UE 102. The DownloadOrder message includes an eSIM type value that indicates that multiple eSIMs should be generated for the UE 102. In some embodiments, the eSIM type value indicates that at least one eSIM of the multiple eSIMs should be compatible with a 5G capable UE 102. At 412, the SM-DP+ server 304 prepares multiple eSIMs, each eSIM using an identical ICCID value. The multiple eSIMs can correspond to different wireless communication capabilities of the UE 102. The multiple eSIMs can include a set of common eSIM configuration data, such as one or more of ciphering keys, integrity keys, applets, elementary files, and/or dedicated files, for each of the eSIMs. In some embodiments, the multiple eSIMs include a first eSIM for a UE 102 that supports a 5G wireless communication protocol and a second eSIM for a UE 102 that does not support a 5G wireless communication protocol. In some embodiments, capability of the UE 102 to support a particular wireless communication protocol, such as a 5G protocol, is not available when the multiple eSIMs are generated by the SM-DP+ server 304. In some embodiments, the multiple eSIMs include a first eSIM that includes 5G information and a second eSIM that excludes 5G information. In some embodiments, the 5G information includes file structures and/or applets specific to 5G wireless communication protocols. At 414, the SM-DP+ server 304 provides a status message regarding the generation of the multiple eSIMs to the backend server 402. At 416, the backend server 402 requests confirmation of the previously requested download order for the eSIMs, which the SM-DP+ 304 confirms at 418. Preparation of multiple eSIMs that each correspond to an identical ICCID value for future download to a wireless device, e.g., to UE 102, can occur separate in time from the download process.

As previously illustrated in FIG. 3, an eSIM download procedure begins with an authentication procedure between the eUICC 108 of the UE 102 and the SM-DP+ 304 facilitated by LPA 302 at 310, 312, 314, 316, 318, and 320. The authentication procedure includes the LPA 302 providing eUICC information, e.g., eUICCInfo1 obtained at 312, to the SM-DP+ 304, e.g., in the InitiateAuthentication message at 318. The SM-DP+ server 304, in some embodiments, can use the eUICC information, e.g., eUICCinfo1, at 420 to select an eSIM from the multiple eSIMs previously generated. In some embodiments, the eUICC information, e.g., eUICCinfo1, includes a specification version number (Svn) that can be used to indicate support for one or more wireless communication protocols. In some embodiments, the SM-DP+ server 304 can select an eSIM that supports 5G wireless communication protocols based on the eUICC information including an Svn value (or falling within a range of Svn values) that indicates (directly or indirectly) support for 5G. In some embodiments, the SM-DP+ server 304 selects an eSIM based on the eUICC information according to whether the UE 102 supports or does not support 5G wireless communication protocols. After selection of the eSIM based on the eUICC information, e.g., based on the Svn value in eUICCInfo1 at 420, the SM-DP+ server 304, at 422, can discard the non-selected eSIMs that correspond to the identical ICCID value for the selected eSIM. In some embodiments, the SM-DP+ server 304 discards the non-selected eSIMs, at 424, after the bound profile package that includes the selected eSIM for downloading to the UE 102 has been prepared. The download procedure continues as in FIG. 3 including authentication of the SM-DP+ server 304 by the UE 102, authentication of the eUICC 108 by the SM-DP+ server 304, preparation for download of the eSIM, and downloading of the eSIM in a bound profile package from the SM-DP+ server 304 to the eUICC 108 of the UE 102.

Figure 4B:
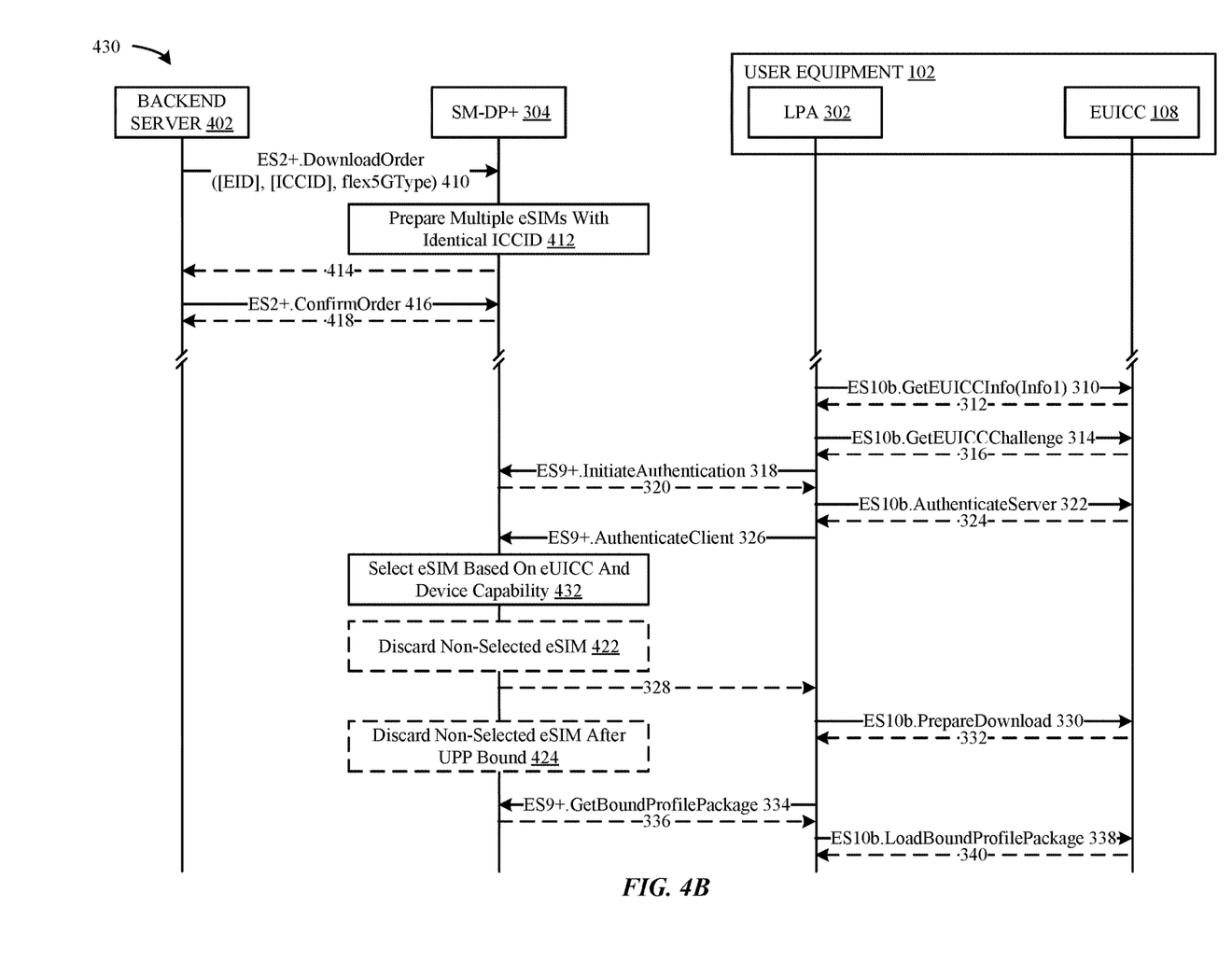

FIG. 4B illustrates a diagram 430 of another exemplary message exchange for flexible eSIM deployment to a UE 102. The procedure illustrated in FIG. 4B differs from that shown in FIG. 4A in that selection of the SIM from the multiple eSIMs occurs after (and/or during) authentication of the eUICC 108. At 432, the SM-DP+ server 304 selects an eSIM for download to the eUICC 108 of the UE 102 based on eUICC and device capability information reported in the AuthenticateClient message received at 326, such as in eUICCinfo2 including in the AuthenticateClient message. In some embodiments, the eUICCinfo2 includes an Svn value that can indicate support for one or more wireless communication protocols. In some embodiments, the SM-DP+ server 304 can select an eSIM that supports 5G wireless communication protocols based on the eUICC information including an Svn value (or falling within a range of Svn values) that indicates (directly or indirectly) support for 5G. In some embodiments, the SM-DP+ server 304 selects an eSIM based on the eUICC information, eUICCinfo2, according to whether the UE 102 supports or does not support 5G wireless communication protocols. After selection of the eSIM based on the eUICC information, e.g., based on the Svn value in eUICCInfo2, the SM-DP+ server 304 discards non-selected eSIMs, e.g., at 422 after selection or at 424 after a bound profile package that includes the selected eSIM is prepared. The non-selected eSIMs can be discarded for security to protect against eSIM cloning.

Figure 5:
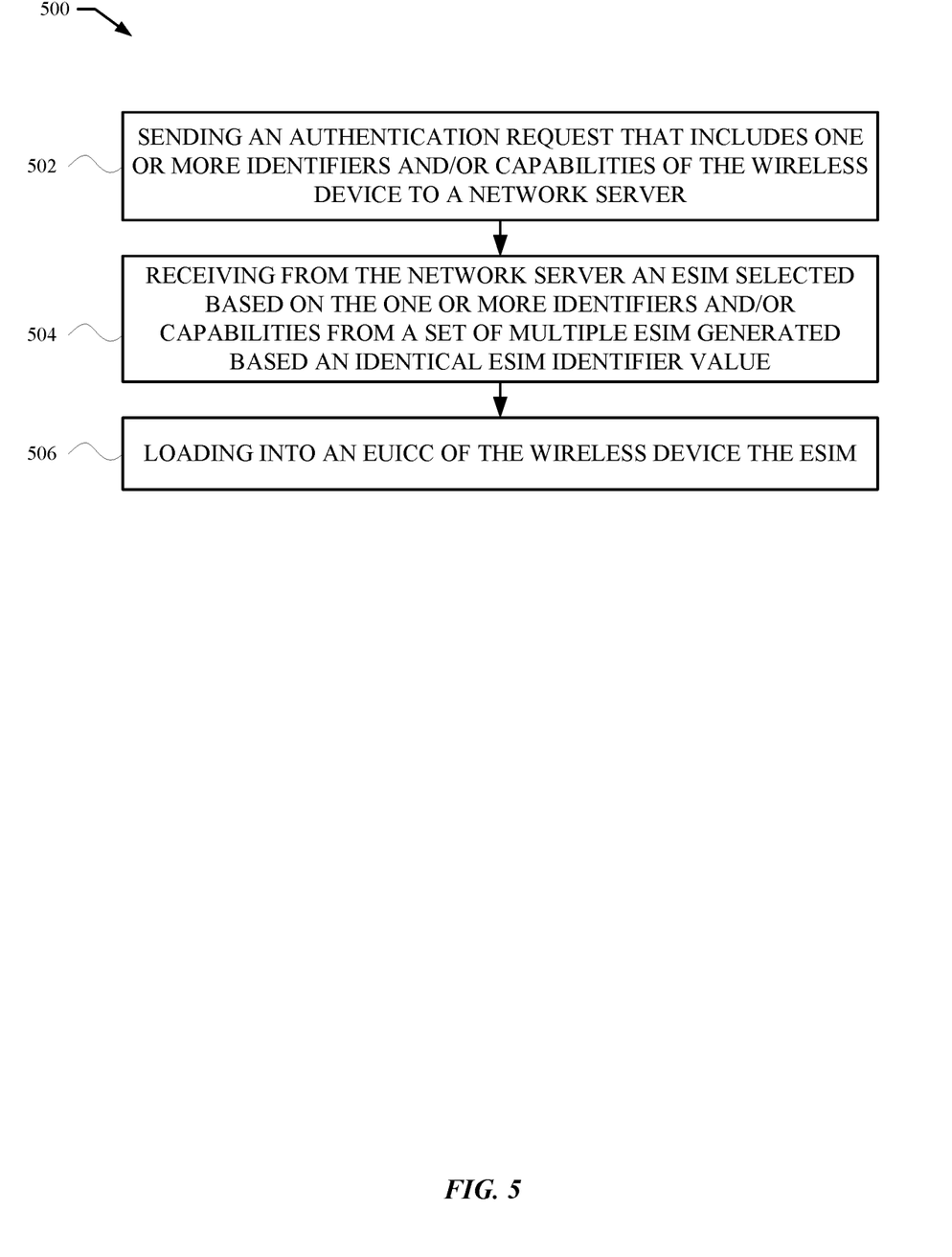
FIG. 5 illustrates a flow diagram of an exemplary sequence of actions by a wireless device for flexible provisioning of an eSIM to a wireless device, according to some embodiments.

FIG. 5 illustrates a flowchart 500 of an exemplary sequence of actions by a UE 102 for flexible provisioning of an eSIM to the UE 102. At 502, the UE 102 sends an authentication request to an MNO network-based server, e.g., SM-DP+ server 304, where the authentication request includes one or more identifiers and/or capabilities of the UE 102. In some embodiments, the authentication request includes a message to initiate mutual authentication between the UE 102 and the MNO network-based server. In some embodiments, the message includes information obtained from the eUICC 108 of the UE 102. In some embodiments, the information includes a specification version number (Svn) indicating supported capabilities of the eUICC 108 and/or the UE 102. In some embodiments, the authentication request includes a message to authenticate the UE 102 and/or eUICC 108 thereof with the MNO network-based server. In some embodiments, the message includes eUICC 108 capabilities and/or device capabilities information, e.g., specification version number (Svn) values and/or wireless communication protocol types supported by the UE 102 and/or by the eUICC 108. In some embodiments, the message includes information to indicate whether the UE 102 and/or the eUICC 108 support a 5G wireless communication protocol. At 504, the UE 102 receives from the MNO network-based server an eSIM selected from multiple eSIMs generated by the MNO network-based server based on an identical eSIM identifier value, where selection is based at least in part on the one or more identifiers and/or capabilities included in the authentication request. In some embodiments, each of the multiple eSIMs is generated based on an identical ICCID value. In some embodiments, each of the multiple eSIMs include a set of common eSIM configuration data, such as one or more of: such as ciphering keys, integrity keys, applets, elementary files, and/or dedicated files. In some embodiments, the multiple eSIMs include a first eSIM that supports a 5G wireless communication protocol and a second eSIM that does not support 5G wireless communication protocols. At 506, the UE 102 loads the eSIM into the eUICC 108 of the UE 102.

Figure 6:
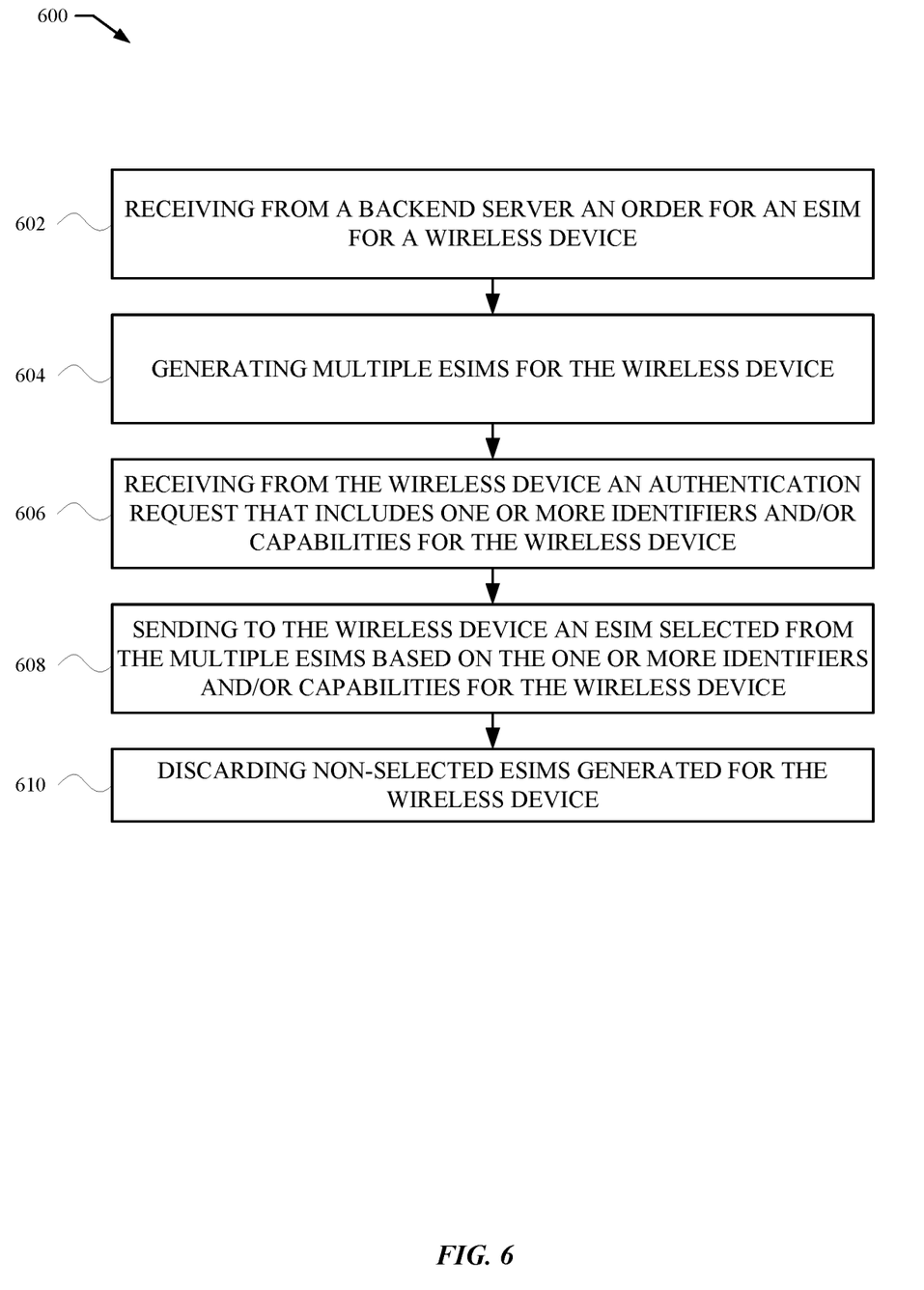
FIG. 6 illustrates a flow diagram of an exemplary sequence of actions by a network entity for flexible provisioning of an eSIM to a wireless device, according to some embodiments.

FIG. 6 illustrates a flowchart 600 of an exemplary sequence of actions by an MNO network-based server for flexible provisioning of an eSIM to a UE 102. At 602, the MNO network-based server, e.g., SM-DP+ server 304, receives from an MNO backend server, e.g., an entitlement server, a message initiating a download order for an eSIM for a UE 102. In some embodiments, the message includes a unique hardware identifier value for the UE 102, e.g., an eUICC 108 identifier (EID) value. In some embodiments, the message excludes identifier values for a UE 102 and does not specify a particular UE 102. In some embodiments, the message includes a unique eSIM identifier value, e.g., an ICCID value. In some embodiments, the message includes an eSIM type indication, e.g., a value for an eSIM type supported by the UE 102. In some embodiments, the eSIM type indication includes a value that indicates whether the UE 102 supports a particular wireless communication protocol or range of wireless communication protocols. In some embodiments, the eSIM type indication includes a value that indicates whether the UE 102 supports a 5G wireless communication protocol. In some embodiments, the eSIM type indication includes a value that indicates multiple eSIMs should be generated for the UE 102. At 604, the MNO network-based server generates multiple eSIMs for the UE 102, where the multiple eSIMs are based on an identical ICCID value, included in the download order message received from the backend server or generated separately by the MNO network-based server. In some embodiments, the multiple eSIMs each include a set of common eSIM configuration data, such as one or more of: ciphering keys, integrity keys, applets, elementary files, and/or dedicated files. In some embodiments, the multiple eSIMs include a first eSIM that supports a 5G wireless communication protocol and a second eSIM that does not support 5G wireless communication protocols. At 606, the MNO network-based server receives from the UE 102 an authentication request that includes one or more identifiers and/or capabilities of the UE 102. In some embodiments, the authentication request includes a message to initiate mutual authentication between the UE 102 and the MNO network-based server. In some embodiments, the message includes information from the eUICC 108 of the UE 102. In some embodiments, the information includes a specification version number (Svn) indicating supported capabilities of the eUICC 108 and/or the UE 102. In some embodiments, the authentication request includes a message to authenticate the UE 102 and/or eUICC 108 thereof with the MNO network-based server. In some embodiments, the message includes eUICC 108 capabilities and/or device capabilities information, e.g., specification version number (Svn) values and/or wireless communication protocol types supported by the UE 102 and/or by the eUICC 108. In some embodiments, the message includes information to indicate whether the UE 102 and/or the eUICC 108 supports a 5G wireless communication protocol. At 608, the MNO network-based server sends to the UE 102 an eSIM selected from the multiple eSIMs, where selection is based at least in part on the identifiers and/or capabilities for the UE 102 included in the authentication request. In some embodiments, the eSIM selected supports a 5G wireless communication protocol based on an indication from the UE 102 that the UE 102 supports the 5G wireless communication protocol. In some embodiments, the eSIM selected does not support a 5G wireless communication protocol based on an indication from the UE 102 that the UE 102 does not support the 5G wireless communication protocol. At 610, the MNO network-based server discards non-selected eSIMs previously generated for the UE 102. In some embodiments, the MNO network-based server discards the non-selected eSIMs after a bound profile package that includes the selected eSIM is generated.

Figure 7:
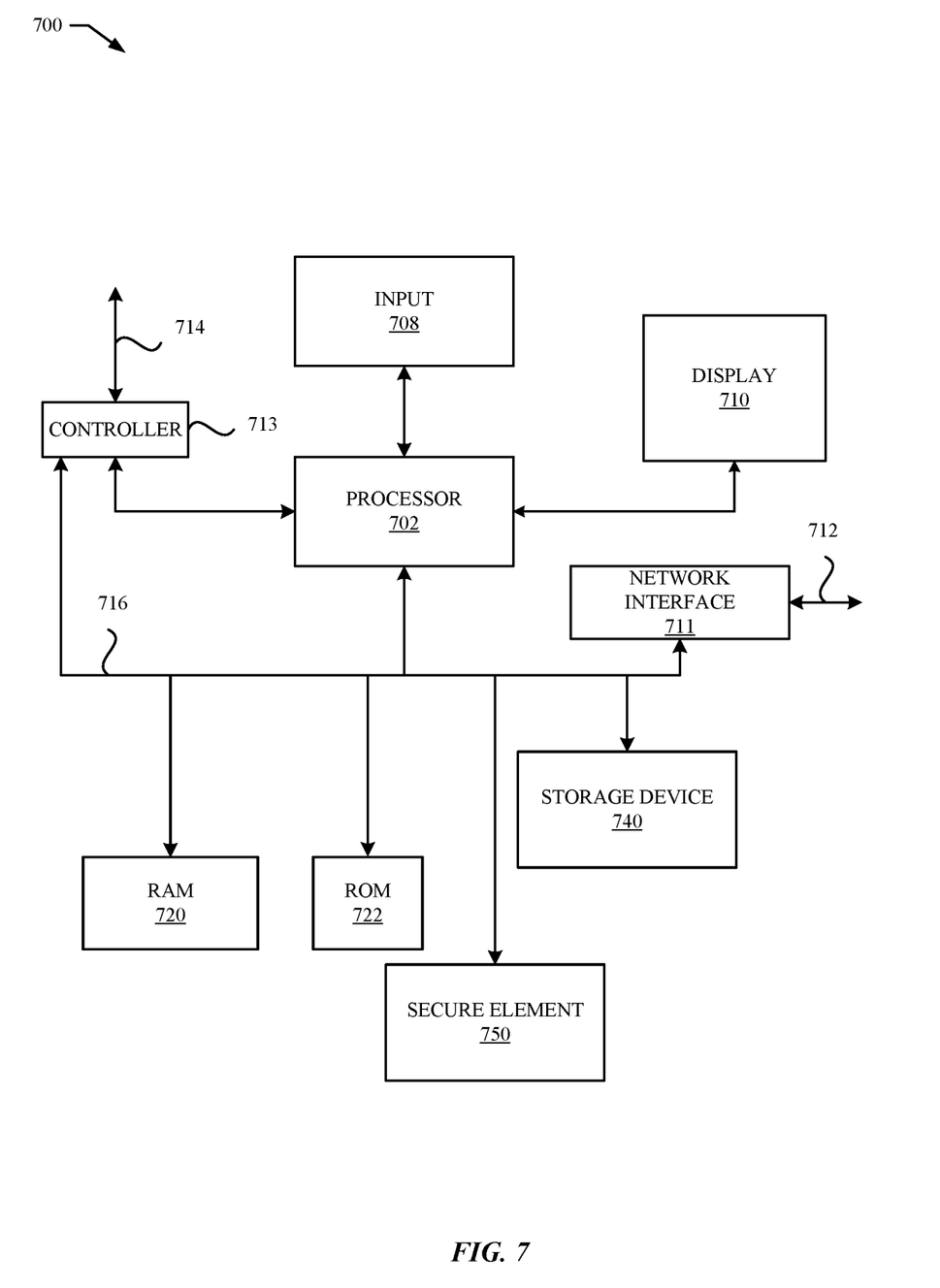
FIG. 7 illustrates a detailed view of a representative computing device that can be used to implement various methods described herein, according to some embodiments.

FIG. 7 illustrates a detailed view of a representative computing device 700 that can be used to implement various methods described herein, according to some embodiments. In particular, the detailed view illustrates various components that can be included in the UE 102 illustrated in FIG. 1. As shown in FIG. 7, the computing device 700 can include a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 that can be controlled by the processor 702 to display information to the user. A data bus 716 can facilitate data transfer between at least a storage device 740, the processor 702, and a controller 713. The controller 713 can be used to interface with and control different equipment through and equipment control bus 714. The computing device 700 can also include a network/bus interface 711 that couples to a data link 712. In the case of a wireless connection, the network/bus interface 711 can include a wireless transceiver.

The computing device 700 also includes a storage device 740, which can comprise a single disk or a plurality of disks (e.g., hard drives), and includes a storage management module that manages one or more partitions within the storage device 740. In some embodiments, storage device 740 can include flash memory, semiconductor (solid state) memory or the like. The computing device 700 can also include a Random Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing device 700. The computing device 700 can further include a secure element (SE) 750, which can represent an eUICC 108 of the UE 102.

Representative Embodiments

In some embodiments, a method for flexible deployment of eSIMs 208 to a wireless device, e.g., UE 102, includes the wireless device: i) sending, to an MNO network-based server, e.g., SM-DP+ 304 server, an authentication request including one or more identifiers and/or capabilities of the wireless device; ii) receiving, from the MNO network-based server, an eSIM 208 selected from multiple eSIMs 208 based on the one or more identifiers and/or capabilities of the wireless device, wherein the multiple eSIMs 208 are generated by the MNO network-based server based on an identical eSIM identifier value and include a set of common eSIM configuration data; and iii) loading the eSIM 208 into an eUICC 108 of the wireless device.

In some embodiments, the authentication request includes a message to initiate mutual authentication between the wireless device and the MNO network-based server. In some embodiments, the message includes information obtained from the eUICC 108 of the wireless device. In some embodiments, the information includes a specification version number (Svn) indicating supported capabilities of the eUICC 108 and/or the wireless device. In some embodiments, the authentication request includes a second message to authenticate the wireless device and/or the eUICC 108 with the MNO network-based server. In some embodiments, the second message includes eUICC 108 and/or wireless device capabilities information that specifies one or more wireless communication protocols and/or protocol types supported by the eUICC 108 and/or wireless device. In some embodiments, the authentication request includes information to indicate whether the wireless device and/or the eUICC 108 support a 5G wireless communication protocol. In some embodiments, selection of the eSIM 208 is based at least in part on whether the wireless device and/or the eUICC 108 support the 5G wireless communication protocol. In some embodiments, the identical eSIM 208 identifier value includes an ICCID value. In some embodiments, the multiple eSIMs 208 include a first eSIM 208 that supports a 5G wireless communication protocol and a second eSIM 208 that does not support 5G wireless communication protocols. In some embodiments, the MNO network-based server includes an SM-DP+ 304 server. In some embodiments, the set of common eSIM 208 configuration data includes one or more of: ciphering keys, integrity keys, applets, elementary files, and/or dedicated files.

In some embodiments, a method for flexible deployment of eSIMs 208 to a wireless device, e.g., UE 102, includes an MNO network-based server, e.g., SM-DP+ 304: i) receiving, from a backend server 402, a message to initiate a download order for an eSIM 208 for a wireless device; ii) generating, for the wireless device, multiple eSIMs 208 based on an identical eSIM 208 identifier value, wherein the multiple eSIMs 208 each include a set of common eSIM 208 configuration data; iii) receiving, from the wireless device, an authentication request including one or more identifiers and/or capabilities of the wireless device; iv) sending, to the wireless device, an eSIM 208 selected from the multiple eSIMs 208 based on the one or more identifiers and/or capabilities of the wireless device; and v) discarding remaining non-selected eSIMs 208 of multiple eSIMs 208 generated for the wireless device.

In some embodiments, the message includes one or more of: a unique hardware identifier value for the wireless device, a unique eSIM 208 identifier value, or an eSIM 208 type indication. In some embodiments, the unique hardware identifier value includes an EID value of the wireless device. In some embodiments, the unique eSIM 208 identifier value includes an ICCID value. In some embodiments, the eSIM 208 type indication includes a value that indicates whether the wireless device supports a particular wireless communication protocol. In some embodiments, the particular wireless communication protocol includes a 5G wireless communication protocol. In some embodiments, the eSIM 208 type indication includes a value that indicates the multiple eSIMs 208 for the wireless device should be generated. In some embodiments, the identical eSIM 208 identifier value includes an ICCID value included in the message received from the backend server 402. In some embodiments, the identical eSIM 208 identifier value includes an ICCID value generated by the MNO network-based server. In some embodiments, the multiple eSIMs 208 comprise a first eSIM 208 that supports a 5G wireless communication protocol and a second eSIM 208 that does not support 5G wireless communication protocols. In some embodiments, the authentication request includes a message to initiate mutual authentication between the wireless device and the MNO network-based server. In some embodiments, the message includes a specification version number (Svn) indicating supported capabilities of an eUICC 108 of the wireless device and/or supported capabilities of the wireless device. In some embodiments, the authentication request includes a second message to authenticate the wireless device and/or the eUICC 108 with the MNO network-based server. In some embodiments, the second message includes eUICC 108 and/or wireless device capability information that specifies one or more wireless communication protocols and/or protocol types supported by the eUICC 108 and/or wireless device. In some embodiments, the authentication request includes information to indicate whether the wireless device and/or the eUICC 108 support a 5G wireless communication protocol. In some embodiments, selection of the eSIM 208 is based at least in part on whether the wireless device and/or the eUICC 108 support the 5G wireless communication protocol. In some embodiments, the MNO network-based server includes an SM-DP+ 304 server. In some embodiments, the set of common eSIM configuration data includes one or more of: ciphering keys, integrity keys, applets, elementary files, and/or dedicated files.

In some embodiments, a wireless device, e.g., UE 102, includes one or more antennas, and at least one processor communicatively coupled to the one or more antennas and to a memory storing instructions that, when executed by the at least one processor, cause the wireless device to perform a method as described herein.

In some embodiments, an apparatus configured for operation in a wireless device, e.g., UE 102, includes at least one processor communicatively coupled to a memory storing instructions that, when executed by the at least one processor, cause the wireless device to perform a method as described herein.

In some embodiments, an MNO network-based server configured for flexible deployment of eSIMs 208 to a wireless device, e.g., UE 102, includes at least one communication interface for communicating with the wireless device; and at least one processor communicatively coupled to a memory storing instructions that, when executed by the at least one processor, cause the MNO network-based server to perform a method as described herein.

Wireless Technology

In accordance with various embodiments described herein, the terms "wireless communication device," "wireless device," "mobile device," "mobile station," and "user equipment" (UE) may be used interchangeably herein to describe one, or any number of, common consumer electronic device(s) that may be capable of performing procedures associated various embodiments the disclosure. In accordance with various implementations, any one of these consumer electronic devices may relate to: a cellular phone or a smart phone, a tablet computer, a laptop computer or a netbook computer, a media player device, an electronic book device, a MiFi® device, a wearable computing device, as well as any other type of electronic computing device having fourth generation (4G) Long Term Evolution (LTE) and LTE Advanced (LTE-A), fifth generation (5G) new radio (NR), or similar "later generation" cellular wireless access communication capabilities.

Additionally, it should be understood that the UEs described herein may be configured as multi-mode wireless devices that are also capable of communicating via legacy third generation (3G) and/or second generation (2G) RATs in addition to communicating with 4G wireless networks, as well as communicating using one or more different wireless local area networks. Multi-mode UEs can include support for communication in accordance with one or more different wireless communication protocols developed by standards bodies, e.g., 3GPP's Global System for Mobile Communications (GSM), Universal Mobile Telecommunications System (UMTS), LTE, LTE-A, and 5G NR standards or 3GPP2's CDMA2000 (1×RTT, 2×EV-DO, HRPD, eHRPD) standards. Multi-mode UEs can also support communication using wireless local area networking protocols, e.g., the Institute of Electrical and Electronics Engineers (IEEE) 802.11 (Wi-Fi), IEEE 802.16 (WiMAX), and wireless personal area networking protocols, e.g., Bluetooth®. Multiple wireless communication protocols can provide complementary functions and/or different services for a multi-mode UE.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The various aspects, embodiments, implementations or features of the described embodiments can be used separately or in any combination. Further, some aspects of the described embodiments may be implemented by software, hardware, or by a combination of hardware and software. The described embodiments can also be embodied as computer program code stored on a non-transitory computer-readable medium. The computer readable-medium may be associated with any data storage device that can store data, which can thereafter be read by a computer or a computer system. Examples of the computer-readable medium include read-only memory, random-access memory, CD-ROMs, Solid-State Disks (SSD or Flash), HDDs, DVDs, magnetic tape, and optical data storage devices. The computer-readable medium can also be distributed over network-coupled computer systems so that the computer program code may be executed in a distributed fashion.

The foregoing description, for purposes of explanation, used specific nomenclature to provide a thorough understanding of the described embodiments. However, it will be apparent to one skilled in the art that some of the specific details are not required in order to practice the described embodiments. Thus, the foregoing descriptions of specific embodiments are presented herein for purposes of illustration and description. These descriptions are not intended to be exhaustive, all-inclusive, or to limit the described embodiments to the precise forms or details disclosed. It will be apparent to one of ordinary skill in the art that many modifications and variations are possible in view of the above teachings, without departing from the spirit and the scope of the disclosure.

What is claimed is:

1. A wireless device comprising:
   one or more antennas; and
   at least one processor communicatively coupled to the one or more antennas and to a memory storing instructions that, when executed by the at least one processor, cause the wireless device to perform a method that includes:
   sending, to a mobile network operator (MNO) network-based server, an authentication request including one or more identifiers and/or capabilities of the wireless device;
   receiving, from the MNO network-based server, an eSIM selected from multiple eSIMs based on the one or more identifiers and/or capabilities of the wireless device, wherein:
   the multiple eSIMs are generated by the MNO network-based server responsive to a message to initiate a download order for an eSIM for the wireless device received from a backend server before the authentication request from the wireless device, the message including an eSIM type value indicating multiple eSIMs are to be generated for the wireless device, at least one eSIM of the multiple eSIMs supports a fifth generation (5G) wireless communication protocol, and at least one eSIM of the multiple eSIMs does not support a 5G wireless communication protocol, based on an identical eSIM identifier value and include a set of common eSIM configuration data; and
   loading the eSIM into an embedded universal integrated circuit card (eUICC) of the wireless device.

2. The wireless device of claim 1, wherein:
   the authentication request includes a message to initiate mutual authentication between the wireless device and the MNO network-based server;
   the message includes information obtained from the eUICC of the wireless device; and
   the information includes a specification version number (Svn) indicating supported capabilities of the eUICC and/or the wireless device.

3. The wireless device of claim 1, wherein:
   the authentication request includes a second message to authenticate the wireless device and/or the eUICC with the MNO network-based server; and
   the second message includes eUICC and/or wireless device capabilities information that specifies one or more wireless communication protocols and/or protocol types supported by the eUICC and/or the wireless device.

4. The wireless device of claim 1, wherein:
   the authentication request includes information to indicate whether the wireless device and/or the eUICC support a fifth generation (5G) wireless communication protocol; and
   selection of the eSIM is based at least in part on whether the wireless device and/or the eUICC support the 5G wireless communication protocol.

5. The wireless device of claim 1, wherein the identical eSIM identifier value comprises an integrated circuit card identifier (ICCID) value.

6. The wireless device of claim 1, wherein the MNO network-based server comprises a subscription manager data preparation (SM-DP+) server.

7. The wireless device of claim 1, wherein the set of common eSIM configuration data includes one or more of: ciphering keys, integrity keys, applets, elementary files, and/or dedicated files.

8. A mobile network operator (MNO) network-based server configured for flexible deployment of electronic subscriber identity modules (eSIMs) to a wireless device, the MNO network-based server comprising:
   at least one communication interface for communicating with the wireless device;
   and at least one processor communicatively coupled to a memory storing instructions that, when executed by the at least one processor, cause the MNO network-based server to perform a method that includes: receiving, from a backend server, a message to initiate a download order for an eSIM for the wireless device, the message including an eSIM type value indicating multiple eSIMs are to be generated for the wireless device, at least one eSIM of the multiple eSIMs supports a fifth generation (5G) wireless communication protocol, and at least one eSIM of the multiple eSIMs does not support a 5G wireless communication protocol;

generating, for the wireless device, multiple eSIMs based on an identical eSIM identifier value, wherein: the multiple eSIMs each include a set of common eSIM configuration data;

receiving, from the wireless device, an authentication request including one or more identifiers and/or capabilities of the wireless device; sending, to the wireless device, an eSIM selected from the multiple eSIMs based on the one or more identifiers and/or capabilities of the wireless device; and discarding remaining non-selected eSIMs of multiple eSIMs generated for the wireless device.

9. The MNO network-based server of claim 8, wherein the message further includes one or more of: a unique hardware identifier value for the wireless device, or a unique eSIM identifier value.

10. The MNO network-based server of claim 9, wherein the unique hardware identifier value comprises an embedded Universal Integrated Circuit Card (eUICC) identifier (EID) value of the wireless device.

11. The MNO network-based server of claim 9, wherein the unique eSIM identifier value comprises an integrated circuit card identifier (ICCID) value.

12. The MNO network-based server of claim 9, wherein the eSIM type value indicates that at least one eSIM of the multiple eSIMs to be generated should be compatible with the 5G wireless communication protocol.

13. The MNO network-based server of claim 8, wherein the identical eSIM identifier value comprises an integrated circuit card identifier (ICCID) value included in the message received from the backend server.

14. The MNO network-based server of claim 8, wherein the identical eSIM identifier value comprises an integrated circuit card identifier (ICCID) value generated by the MNO network-based server.

15. The MNO network-based server of claim 8, wherein:
the authentication request includes a message to initiate mutual authentication between the wireless device and the MNO network-based server;
the message includes a specification version number (Svn) indicating supported capabilities of an embedded universal integrated circuit card (eUICC) of the wireless device and/or supported capabilities of the wireless device;
the authentication request includes a second message to authenticate the wireless device and/or the eUICC with the MNO network-based server; and
the second message includes eUICC and/or wireless device capability information that specifies one or more wireless communication protocols and/or protocol types supported by the eUICC and/or the wireless device.

16. The MNO network-based server of claim 8, wherein:
the authentication request includes information to indicate whether the wireless device and/or an embedded universal integrated circuit card (eUICC) support the 5G wireless communication protocol; and
selection of the eSIM is based at least in part on whether the wireless device and/or the eUICC support the 5G wireless communication protocol.

17. An apparatus configured for operation in a wireless device, the apparatus comprising:
at least one processor communicatively coupled a memory storing instructions that, when executed by the at least one processor, cause the wireless device to perform a method that includes:
sending, to a mobile network operator (MNO) network-based server, an authentication request including one or more identifiers and/or capabilities of the wireless device indicating support for a fifth generation (5G) wireless communication protocol;
receiving, from the MNO network-based server, an eSIM selected from multiple eSIMs based on the one or more identifiers and/or capabilities of the wireless device, wherein:
the multiple eSIMs are generated by the MNO network-based server responsive to a message to initiate a download order for an eSIM for the wireless device received from a backend server before the authentication request from the wireless device, the message including an eSIM type value indicating multiple eSIMs are to be generated for the wireless device, at least one eSIM of the multiple eSIMs supports a fifth generation (5G) wireless communication protocol, and at least one eSIM of the multiple eSIMs does not support a 5G wireless communication protocol, based on an identical eSIM identifier value and include a set of common eSIM configuration data; and
loading the eSIM into an embedded universal integrated circuit card (eUICC) of the wireless device.

18. The apparatus of claim 17, wherein the identical eSIM identifier value comprises an integrated circuit card identifier (ICCID) value.

19. The apparatus of claim 17, wherein the MNO network-based server comprises a subscription manager data preparation (SM-DP+) server.

20. The apparatus of claim 17, wherein the set of common eSIM configuration data includes one or more of: ciphering keys, integrity keys, applets, elementary files, and/or dedicated files.

* * * * *